United States Patent [19]

Kanaya et al.

[11] Patent Number: 5,663,796

[45] Date of Patent: Sep. 2, 1997

[54] OPTICAL SENSOR AND OPTICAL APPARATUS USING THE SAME

[75] Inventors: Motonori Kanaya; Kazuyoshi Yamasaki, both of Omiya, Japan

[73] Assignee: Fuji Photo Optical Co., Ltd., Omiya, Japan

[21] Appl. No.: 612,789

[22] Filed: Mar. 11, 1996

[30] Foreign Application Priority Data

May 23, 1995 [JP] Japan .................... 7-148308

[51] Int. Cl.$^6$ .................................. G01B 11/24
[52] U.S. Cl. .............. 356/376; 356/373; 250/237 G; 250/559.37; 250/222.1
[58] Field of Search ................. 356/374, 430, 356/376; 250/237 G, 559.32, 222.1, 559.12

[56] References Cited

U.S. PATENT DOCUMENTS 3,524,066  8/1970  Blakkan .......................... 356/401
3,677,652  7/1972  Little ............................. 356/183
4,792,678 12/1988  Spies ............................. 250/231
5,485,276  1/1996  Bien et al. ...................... 356/437

Primary Examiner—David C. Nelms
Assistant Examiner—Zandra V. Smith
Attorney, Agent, or Firm—Ronald R. Snider

[57] ABSTRACT

In an optical apparatus utilizing moire fringes to inspect surface irregularities of a test object, a single light beam forms a light beam network in an optical sensor (28) such that the test object can be two-dimensionally detected, thereby preventing the test object from abnormally approaching a moire grating (12). The light beam is reflected between a pair of mirrors (50, 52) a plurality of times within an identical plane and then the optical sensor (28) detects the intensity of the light beam. The optical sensor (28) is disposed such that the light beam network is positioned directly below the moire grating (12). Accordingly, a test object (2) abnormally approaching the moire grating (12) can be two-dimensionally detected by the light beam network, thereby improving the accuracy in detection.

7 Claims, 2 Drawing Sheets

OPTICAL SENSOR AND OPTICAL APPARATUS USING THE SAME

RELATED APPLICATIONS

This application claims the priority of Japanese Patent Application No.7-148308 filed on May 23, 1995, which is incorporated herein by reference.

BACKGROUND OF THE INVENTION

1. Field of the Invention

The present invention relates to an optical sensor which detects position of an object according to an optical beam shielding action of the object and an optical apparatus using such an optical sensor.

2. Description of the Prior Art

Conventionally, as a method for inspecting irregularities in an object, there has been known an inspection method using an optical apparatus in which moire fringes are utilized.

In the optical apparatus utilizing moire fringes, while a moire grating is disposed with a predetermined distance from a test object and illuminated with a light beam, the moire grating and the test object are observed from a direction different from the direction of the incident light beam, thereby inspecting the irregularities of the object.

Such an optical apparatus utilizing moire fringes is provided with means for supporting and moving the test object which supports the test object while allowing the latter to move in a predetermined direction so as to make the test object sufficiently approach the moire grating, thereby forming clear moire fringes.

However, in the above-mentioned conventional optical apparatus, in cases where a surface for supporting the test object in the means for supporting and moving the test object has an inclination, when the test object approaches the moire grating, a part of the test object may abut to the moire grating before the test object is placed at a predetermined approaching position, thereby damaging the moire grating. Also, due to fluctuation in size of the test object and mishandling of the test object, for example, the test object may abut to the moire grating.

In view of these problems, an optical sensor may be used to detect abnormal approaching of the test object to the moire grating. However, a normal optical sensor may not attain a sufficient accuracy in detection since it can recognize an object only along a single line which connects a light source and a light-receiving device together.

Also, in order to improve the accuracy in detection, a plurality of optical sensors may be disposed in parallel so as to detect the above-mentioned abnormal approaching. However, in this case, the apparatus may need a complicated configuration with a higher cost.

These problems are common not only in the optical apparatus utilizing moire fringes but also in cases where abnormal approaching may occur as well as in various cases where it is necessary to detect position of an object.

SUMMARY OF THE INVENTION

In view of these circumstances, the object of the present invention is to provide an optical sensor which can accurately detect, in a simple configuration, position of an object.

Another object of the present invention is to provide an optical apparatus using such an optical sensor.

In accordance with the present invention, a light beam of an optical sensor is reflected a plurality of times within an identical plane by a plurality of mirrors disposed in a predetermined manner such that a single light beam can form a light beam network so as to two-dimensionally detect the object, thereby attaining the above-mentioned object.

Namely, the optical sensor in accordance with the present invention comprises:

a mirror group comprising a plurality of mirrors which are disposed so as to inwardly face each other such that reflecting surfaces thereof have normals contained within an identical plane;

a light beam input means for making a light beam enter the mirror group with a predetermined incident angle; and a light beam detection means which receives the light beam which is reflected a plurality of times within the mirror group and thereby detects intensity thereof.

Also, the present invention provides an optical apparatus provided with means for supporting and moving a test object which supports the test object while allowing the test object to move in a predetermined direction, wherein the above-mentioned sensor is disposed such that, within the range where the test object is movable, the above-mentioned plane is substantially perpendicular to the direction in which the test object is moved.

In the optical sensor in accordance with the present invention, due to the configuration mentioned above, a light beam entering the mirror group with a predetermined incident angle is reflected a plurality of times within an identical plane before the intensity thereof is detected, thereby allowing an optical beam network to two-dimensionally detect the object. Therefore, not only an object positioned on a single line but objects positioned on a certain plane can be widely detected. Also, such detection can be realized with a single light beam alone.

Also, in the optical apparatus in accordance with the present invention, since the above-mentioned sensor is disposed such that, within the range where the test object is movable, the plane constituted by the light beam of the light sensor is substantially perpendicular to the direction in which the test object is moved; when at least a part of the test object traverses the above-mentioned plane, it can be detected.

Therefore, in accordance with the present invention, position of an object can be accurately detected in a simple configuration.

Accordingly, in an optical apparatus utilizing moire fringes, the test object can be prevented from abnormally approaching a moire grating.

Though the above-mentioned mirror group is not restricted to any specific configuration as long as the normals of reflecting surfaces thereof are contained within an identical plane, the advantageous effects mentioned above can be attained in a very simple configuration when it is constituted by a pair of mirrors which are disposed in parallel.

Also, when the above-mentioned light beam input means is constituted by a laser source and a mirror having a variable reflection angle by which a light beam from the laser source is reflected with an arbitrary reflection angle, the reflection angle can be appropriately set so as to arbitrarily set the density of the light beam network according to the object.

In the optical apparatus utilizing moire fringes, for example, a single piece of the optical sensor may be used alone as well as a plurality of the optical sensors may be sacked in the direction in which the test object is moved. In the latter case, the optical sensor nearest to the moire grating may be used for preventing the test object from abnormally approaching the moire grating while using the other optical sensors for setting the test object at a position where the moire fringes can clearly be seen.

DETAILED DESCRIPTION OF THE PREFERRED EMBODIMENTS

In the following, embodiments of the present invention will be explained with reference to the attached drawings.

Figure 1:
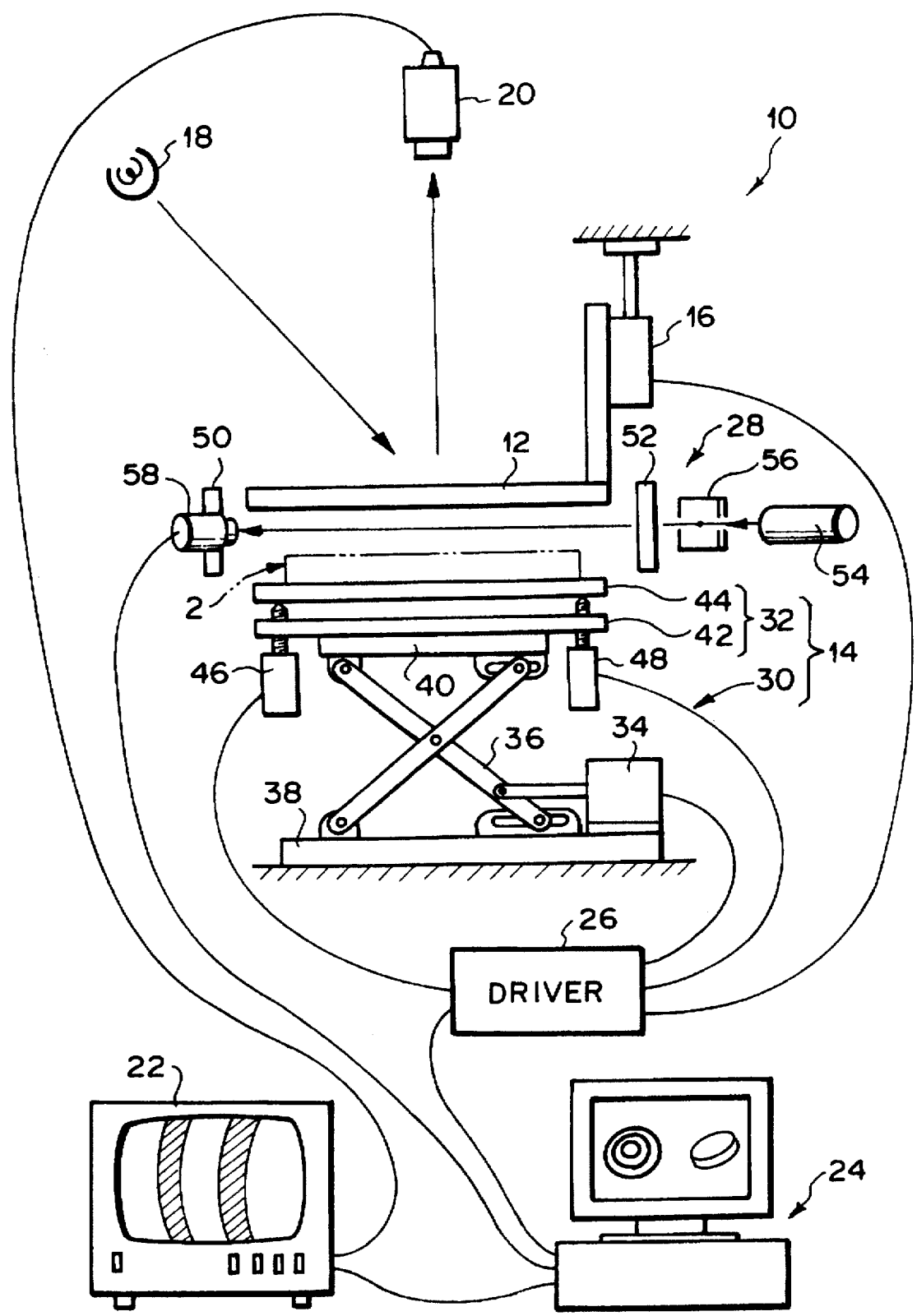
FIG. 1 is an overall configurational view showing an embodiment of the optical apparatus in accordance with the present invention and FIG. 2 is a plan view showing an optical sensor used in the above-mentioned optical apparatus.
Figure 2:
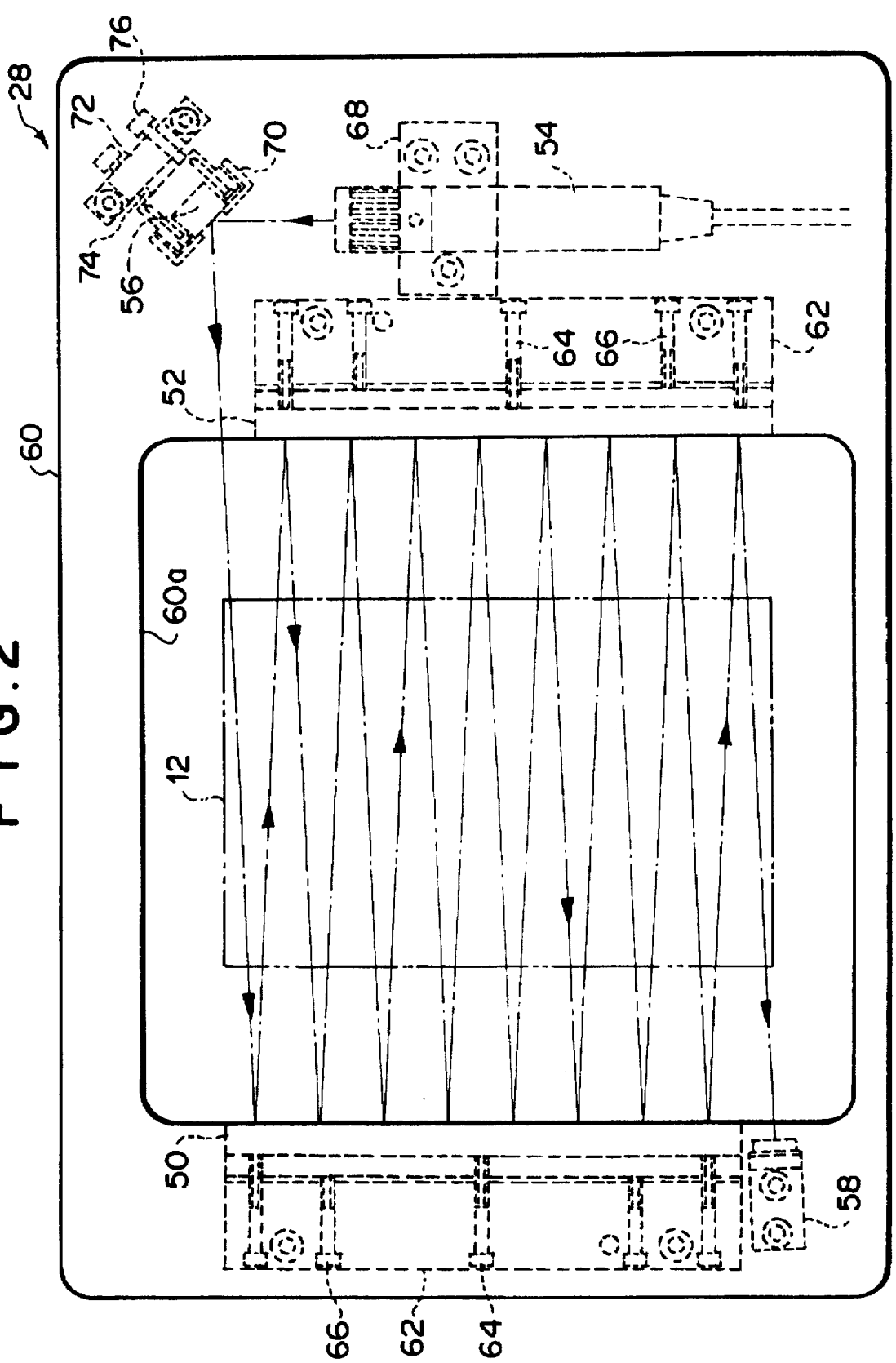

FIG. 1 is an overall configurational view showing an embodiment of the optical apparatus in accordance with the present invention, while FIG. 2 is a plan view showing an optical sensor used in this optical apparatus.

As shown in FIG. 1, this optical apparatus 10 is an apparatus which uses moire fringes to inspect surface irregularities of an optical member such as mirror or filter and comprises a moire grating 12, an object supporting and moving mechanism 14, a fringe scanning actuator 16, a white light source 18, a CCD camera 20, a moire fringe viewing display 22, a controller 24, a driver 26, and an optical sensor 28.

The moire grating 12 comprises a horizontally-disposed glass plate and fringes formed, with a constant pitch therebetween, on the lower surface thereof. It can be moved up and down by the fringe scanning actuator 16.

The object supporting and moving mechanism 14 is constituted by a mechanism 30 and a biaxial swing table 32. In the lift mechanism 30, a motor 34 drives a pantagraph (Z stage) 36 such that an upper plate 40 is moved up and down with respect to a pedestal 38. The biaxial swing table 32 comprises a reference plate 42 fixed to the upper plate 40 of the lift mechanism 30 and a support plate 44 disposed thereabove. With respect to the reference plate 42, the support plate 44 can be tilted by two motors 46 and 48 in orthogonal two directions around a predetermined supporting point. Accordingly, the object supporting and moving mechanism 14 can make a test object 2, which is mounted on the support table 44, approach the moire grating 12, while disposing the test object 2 in parallel to the moire grating 12.

The fringe scanning actuator 16 and the motors 34, 46, and 48 are driven by a controller 24 by way of a driver 26.

The white light source 18 illuminates the moire grating 12 with light from a position obliquely above the moire grating 12 on the side opposite to the fringe scanning actuator 16. On the other hand, the CCD camera 20 is disposed directly above the moire grating 12. Accordingly, the light from the white light source 18 forms, on the surface of the test object 2, a shadow of the moire grating 12 which, together with an image of the moire grating 12 itself, forms moire fringes to be captured by the CCD camera 20.

The moire fringe viewing display 22 displays an enlarged image of the moire fringes captured by the CCD camera 20 so as to be viewed on its screen. Also, the image data fed into the moire fringe viewing display 22 is input into the controller 24.

From the object supporting and moving mechanism 14, data concerning the vertical driving position of its lift mechanism 14 and tilt angular positions in the two directions of the biaxial swing table 32 are input into the controller 24. The posture of the test object 2 is calculated from these data. Also, the controller 24 projects the overall image of the moire fringes and the posture of the test object 2 in parallel upon its display.

In the optical apparatus 10 utilizing such moire fringes, in order to form clear moire fringes, it is important for the test object 2 to sufficiently approach the moire grating 12 (with a distance of about 3 mm or less, specifically).

However, in cases where the support plate 44 of the biaxial swing table 32 is tilted, when the test object is ascended so as to approach the moire grating 12, a part of the test object 2 may abut to the moire grating 12 before the test object 2 reaches a predetermined approaching position, thereby damaging the moire grating 12. Also, due to fluctuation in size of the test object 2 and mishandling of the test object 2, for example, the test object 2 may abut to the moire grating 12.

Accordingly, in this embodiment, directly below the grating 12 (about 0.5 mm below the grating 12) in parallel to the moire grating 12, the optical sensor 28 forms a light beam network for detecting the test object.

As shown in FIG. 2, the optical sensor 28 comprises a pair of mirrors 50 and 52, a laser source 54, a variable reflecting angle mirror 56, a light-receiving device 58, and a substrate 60 for supporting them.

The pair of mirrors 50 and 52 extend in the vertical direction and are disposed in parallel as to inwardly face each other.

With a long bolt 64 and a short bolt 66, each of the mirrors 50 and 52 is attached to a bracket 62 which is fixed to the substrate 60. As these bolts 64 and 66 are adjusted, the mirrors 50 and 52 can be placed with a predetermined degree of parallelism.

The laser source 54 is disposed in parallel to the mirrors 50 and 52 and fixed to the substrate 60 by way of a bracket 68 so as to emit a laser beam in a direction horizontal to the variable reflecting angle mirror 56.

The variable reflecting angle mirror 56 horizontally reflects the laser beam so as to make it incident on the mirror 50 with a predetermined incident angle. Thus incident beam is repeatedly reflected many times between the mirrors 50 and 52 in a zigzag manner before being received by the light-receiving device 58.

The variable reflecting angle mirror 56 constitutes a part of a mirror unit 70. The mirror unit 70 is attached to a bracket 72 fixed to the substrate 60 so as to be rotatable around a vertically-extending support pin 74 such that it can adjust the reflecting angle of the variable reflecting angle mirror 56 with respect to the laser beam as a bolt 76 is adjusted.

The substrate 60 is fixed to a moire grating support plate (not depicted) which supports the moire grating 12. At a center portion of this substrate 60, a substantially square opening 60a is formed, while the pair of mirrors 50 and 52 are respectively disposed at the left and right peripheral portions thereof. The opening 60a is formed with a size sufficiently larger than the planar outer form of the moire grating 12. Accordingly, the test object 2 (having a size smaller than the moire grating 12) is prevented from abutting to the mirrors 50 and 52.

As explained in detail in the foregoing, in the optical sensor 28 in accordance with this embodiment, a light beam is reflected a plurality of times between the pair of mirrors 50 and 52 within an identical plane before the intensity thereof is detected, thereby allowing an optical beam network to two-dimensionally detect the object. Therefore, not only an object positioned on a single line but objects positioned on a certain plane can be widely detected. Also, such detection can be realized with a single light beam alone.

Also, in the optical apparatus in accordance with this embodiment, since the optical sensor 28 is disposed such that the light beam network is positioned directly below the moire grating 12, when at least a part of the test object 2 traverses the plane of the above-mentioned light beam network, it can be detected as the test object 2 abnormally approaching the moire grating 12.

Further, in this embodiment, as the reflecting angle of the variable reflecting angle mirror 56 is adjusted, the incident angle of the light beam with respect to the pair of mirrors 50 and 52 can be appropriately changed, thereby enabling the density of the light beam network to be arbitrarily set according to the object.

What is claimed is:

1. An optical sensor comprising:

mirror group comprising a plurality of mirrors which are disposed so as to inwardly face each other such that reflecting surfaces thereof have normals contained within an identical plane;

a light beam input means for making a light beam enter said mirror group with a predetermined incident angle with respect to one of the mirror;

a light beam detection means which receives the light beam which is reflected a plurality of times within said mirror group and thereby detects intensity thereof; and means for supporting and moving a test object which supports said test object while allowing said test object to move in a predetermined direction wherein an optical sensor is disposed such that, within a range where said test object is movable, said plane of the optical sensor is substantially perpendicular to the direction in which the test object is moved.

2. An optical sensor according to claim 1, wherein said mirror group comprises a pair of mirrors disposed in parallel.

3. An optical sensor according to claim 1, wherein said light beam input means comprises a laser source and a variable reflecting angle mirror which reflects a light beam from said laser source with an arbitrary reflecting angle.

4. An optical apparatus according to claim 1 comprising:

a moire grating disposed with a predetermined distance from said plane of the optical sensor;

an irradiation means for irradiating said moire grating with light from a first direction; and a viewing means for viewing said moire grating and said test object from a second direction which is different from said first direction.

5. An optical sensor apparatus comprising:

an optical sensor comprising:

a mirror group comprising a plurality of mirrors which are disposed so as to inwardly face each other such that reflecting surfaces thereof have normals contained within an identical plane;

a light beam input means for making a light beam enter said mirror group with a predetermined incident angle;

a light beam detection means which receives the light beam which is reflected a plurality of times within said mirror group and thereby detects intensity thereof;

a moire grating disposed with a predetermined distance from said plane of the optical sensor;

an irradiation means for irradiating said moire grating with light from a first direction; and a viewing means for viewing said moire grating and said test object from a second direction which is different from said first direction.

6. An optical sensor apparatus according to claim 5 wherein said mirror group comprises a pair of mirrors disposed in parallel.

7. An optical sensor apparatus according to claim 5, wherein said light beam input means comprises a laser source and a variable reflecting angle mirror which reflects a light beam from said laser source with an arbitrary reflecting angle.

* * * * *